US00RE42706E

(19) United States
(12) Reissued Patent
Davidson et al.

(10) Patent Number: US RE42,706 E
(45) Date of Reissued Patent: Sep. 20, 2011

(54) AIRLESS SPRAY PUMP

(75) Inventors: Glen W. Davidson, Roseville, MN (US); Alexander L. Kapelevich, Shoreview, MN (US)

(73) Assignee: Graco Minnesota Inc., Minneapolis, MN (US)

(21) Appl. No.: 12/798,490

(22) PCT Filed: Aug. 28, 2000

(86) PCT No.: PCT/US00/23613

§ 371 (c)(1),
(2), (4) Date: Feb. 27, 2002

(87) PCT Pub. No.: WO01/16462

PCT Pub. Date: Mar. 8, 2001

Related U.S. Patent Documents

Reissue of:
(64) Patent No.: 6,752,067
Issued: Jun. 22, 2004
Appl. No.: 10/070,117
Filed: Feb. 27, 2002

U.S. Applications:
(60) Provisional application No. 60/166,946, filed on Nov. 22, 1999, provisional application No. 60/151,794, filed on Aug. 31, 1999.

(51) Int. Cl.
*F01B 9/00* (2006.01)
*F04B 9/04* (2006.01)

(52) U.S. Cl. ..... 92/140; 417/415

(58) Field of Classification Search ..... 92/140; 417/415; 74/50
See application file for complete search history.

(56) References Cited

U.S. PATENT DOCUMENTS

| | | | |
|---|---|---|---|
| 2,366,237 | A | 1/1945 | Clausen |
| 2,366,238 | A | 1/1945 | Clausen |
| 3,067,624 | A | 12/1962 | Norton et al. |
| 4,416,588 | A | 11/1983 | Karliner |
| 4,768,932 | A | 9/1988 | Geberth, Jr. |
| 5,111,681 | A | 5/1992 | Yasui et al. |
| 5,567,323 | A | 10/1996 | Harrison, Jr. |
| 5,769,321 | A | 6/1998 | Cyphers |
| 5,842,639 | A | 12/1998 | Walker |

*Primary Examiner* — Thomas E Lazo
(74) *Attorney, Agent, or Firm* — Kinney & Lange, P.A.

(57) ABSTRACT

An airless spray pump is provided with a single-acting piston pump which allows the use of a low-cost yoke drive. Motor and pump shaft are offset for most efficient force utilization.

17 Claims, 7 Drawing Sheets

*AMENDED*

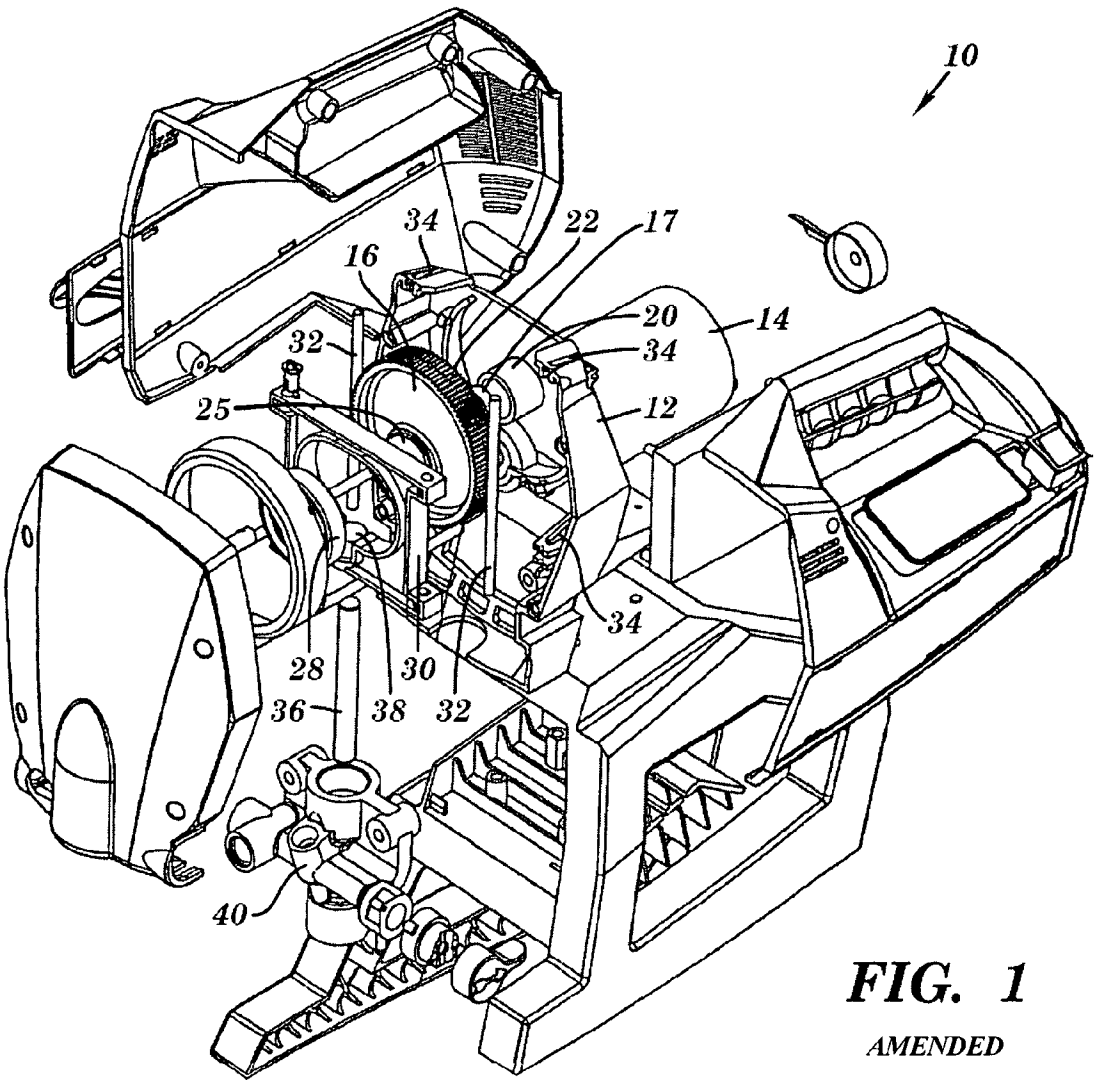
FIG. 1
AMENDED

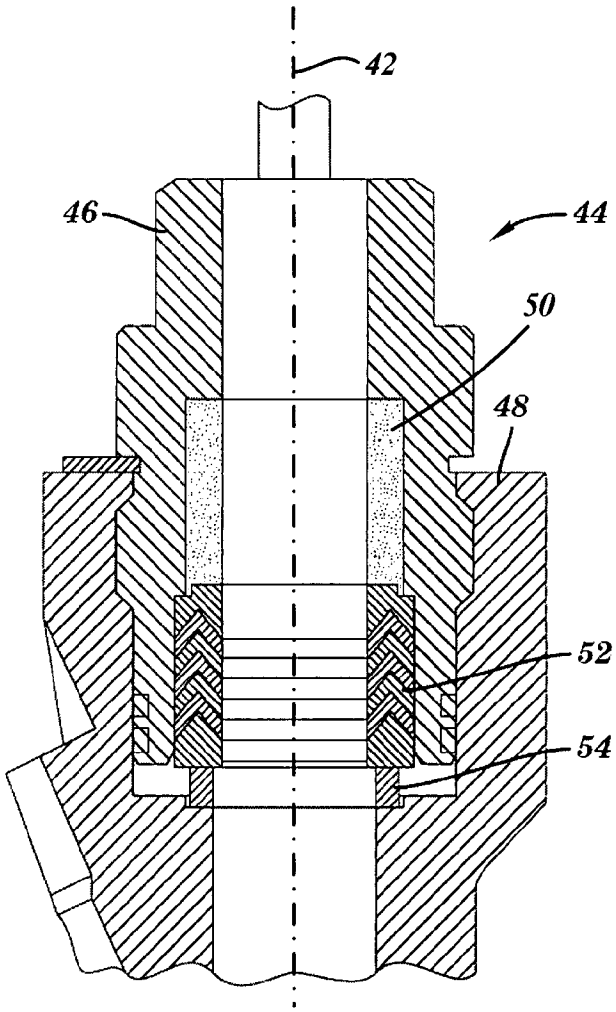
FIG. 4
AMENDED
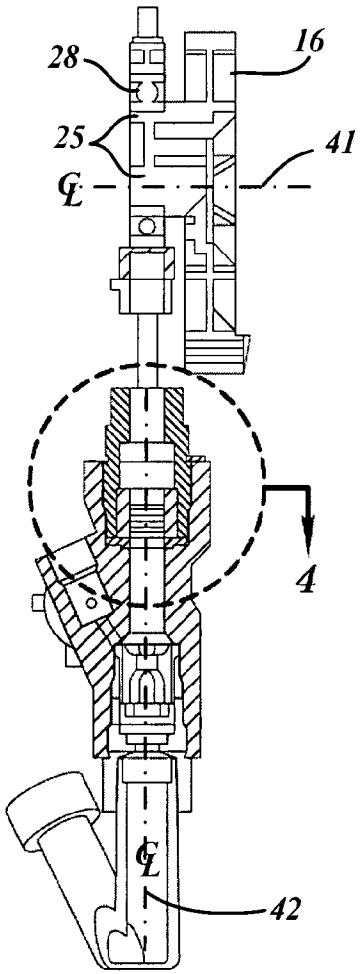
FIG. 3
AMENDED
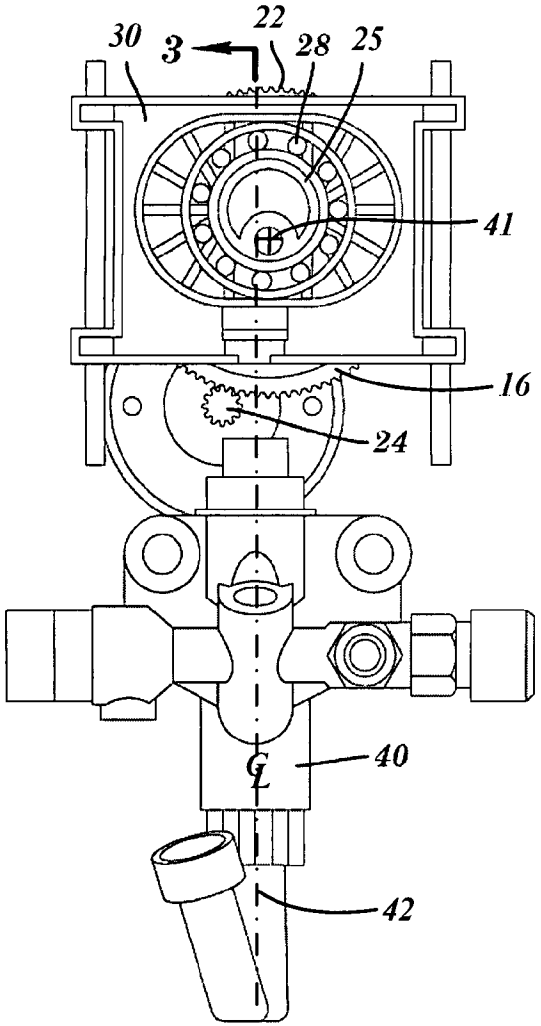
FIG. 2
AMENDED

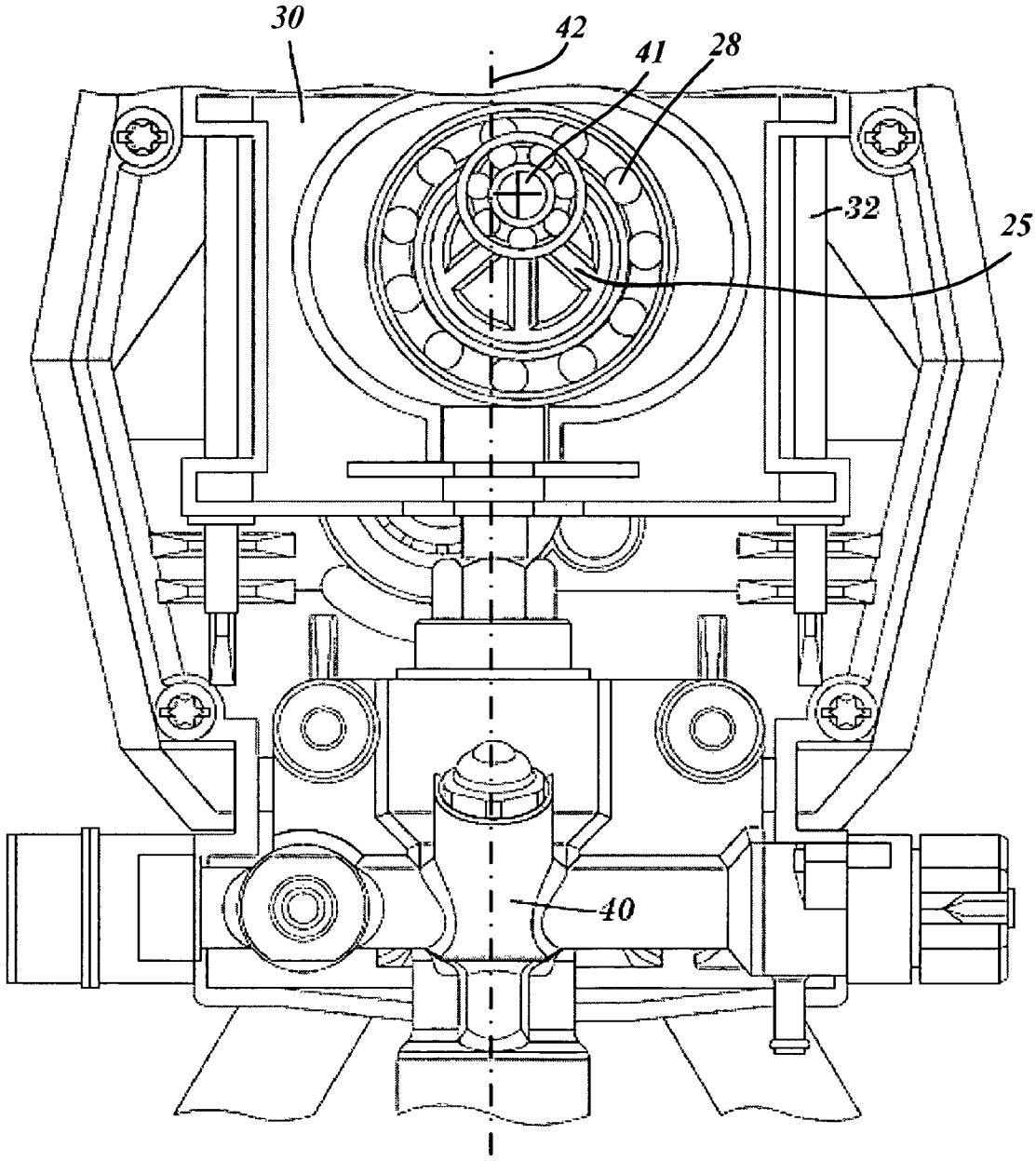
FIG. 6
AMENDED

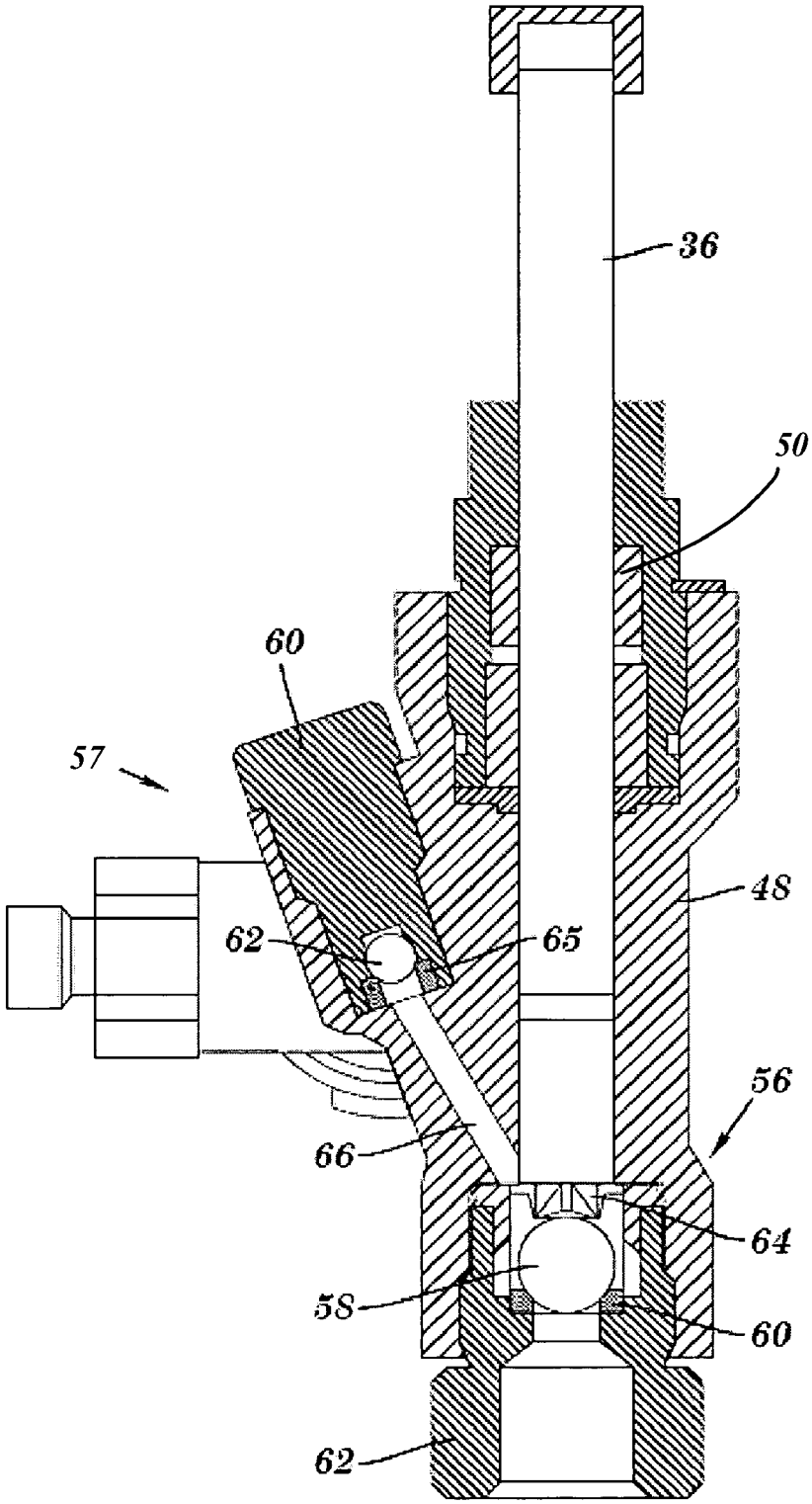
FIG. 7
AMENDED

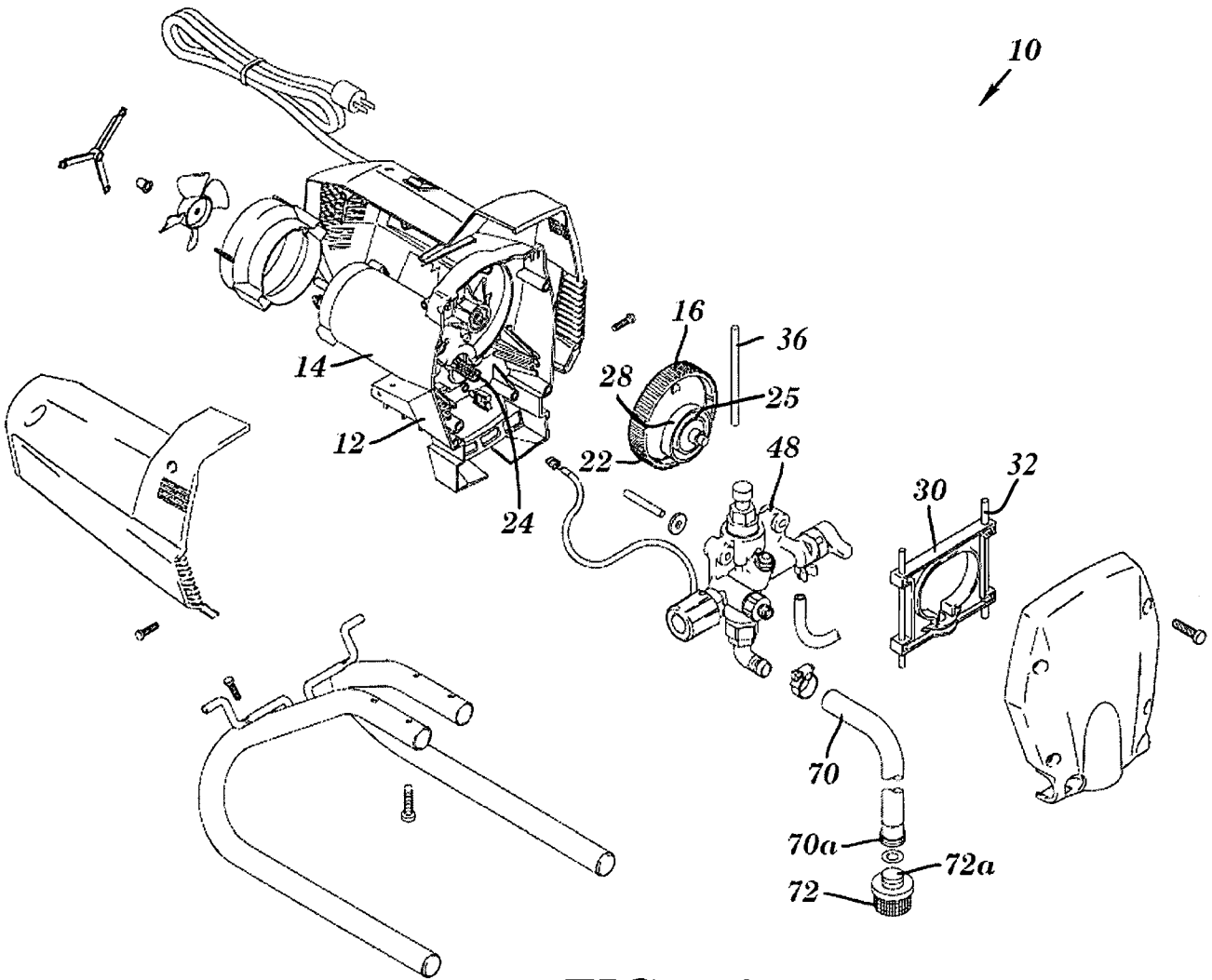
FIG. 10
AMENDED

AIRLESS SPRAY PUMP

Matter enclosed in heavy brackets [ ] appears in the original patent but forms no part of this reissue specification; matter printed in italics indicates the additions made by reissue.

This application claims benefit of Provisional Applications No. 60/151,794 filed Aug. 31, 1999 and No. 60/166,946 filed Nov. 22, 1999.

TECHNICAL FIELD

Airless spray pumps for the spraying of paints and other coatings.

BACKGROUND ART

Airless spray pumps for the spraying of paints and other coatings via the airless method are well known and have traditionally been divided into two types, diaphragm pumps for the lower end of the market and reciprocating piston pumps for the higher end.

DISCLOSURE OF THE INVENTION

An airless spray pump is provided with a single-acting piston pump which allows the use of a low-cost yoke drive. Motor and pump shaft are offset for most efficient force utilization. The main drive housing has a motor mounted to the rear thereof A gear assembly uses gear teeth which are formed with a 5° helical angle and have a 25° pressure angle. This geometry combines the higher efficiency of straight cut gears with the noise reduction typified in a helical design.

An eccentric is molded onto the front of the gear assembly and has located thereabout a bearing assembly which rides inside a yoke. The yoke moves vertically on guide rods which are retained in pockets of the drive housing. The yoke is molded of plastic as is the gear assembly leading to lower cost and easier manufacture.

The pump rod is provided with a cap over the top end thereof which has bearing. Pump assembly is designed as a single acting pump, that is, the pump only pumps on the downward stroke and loads on the upward stroke. This allows the components of the drive train, including the yoke and gear, to be much lighter as the yoke ends up being more of a guidance device rather than a force-applying device.

The motor and pinion are offset from the centerline of the pump assembly. This arrangement does not have any significant cantilevering as the pump rod, pinion, yoke, eccentric and cap are all located in the same plane. The location of the rod and the single acting pump with respect to the gear centerline reduces the thrust loads on the yoke. The location of the pinion on the gear partially offsets and reduces the pump forces on the gear shaft and bearings. By locating the eccentric bearing directly on the end of the pump rod cap which is press-fit it eliminates the transfer of pumping force through an intermediate member such as the yoke which provides longer life, efficiency and allows the manufacture of a more inexpensive yoke assembly.

The shaft packing assembly is comprised of a packing housing which screws into the pump housing and which contains a felt member which has been soaked with throat seal lubricant or other solvent or lubricant. A stack of v-packings are compressed in place by wave spring which is tightened by tightening the seal housing into the pump housing. The inlet check is provided with a check ball and a check seat which is pressed into a check housing and which is held in place by a retainer. These parts all press-fit into one another such that the complete assembly be merely screwed into main pump housing for replacement. Similarly, outlet check assembly is formed of an outlet check housing which is screwed into a pump housing and similarly is provided with a check ball held in place by a retainer. The outlet passageway is angled relative to the axis of the pump shaft. This allows the outlet check assembly to operate essentially via gravity and yet requires only the drilling and provision of one passageway while maintaining an essentially vertical ball-seat relationship.

These and other objects and advantages of the invention will appear more fully from the following description made in conjunction with the accompanying drawings wherein like reference characters refer to the same or similar parts throughout the several views.

BRIEF DESCRIPTION OF DRAWINGS

FIG. 1 is a prospective exploded view showing the airless spray pump with the instant invention.

FIG. 2 is a simple front plan view of the drive assembly and pump of the instant invention.

FIG. 3 is a side plan view of the assembly shown in FIG. 1.

FIG. 4 is a detailed exploded view of the circled area in FIG. 3.

FIG. 6 shows more details of the drive assembly of the instant invention.

FIG. 7 is another cross-sectional view of the pump portion of the instant invention.

FIG. 10 is a perspective exploded view of the instant invention.

BEST MODE FOR CARRYING OUT THE INVENTION

Figure 5:
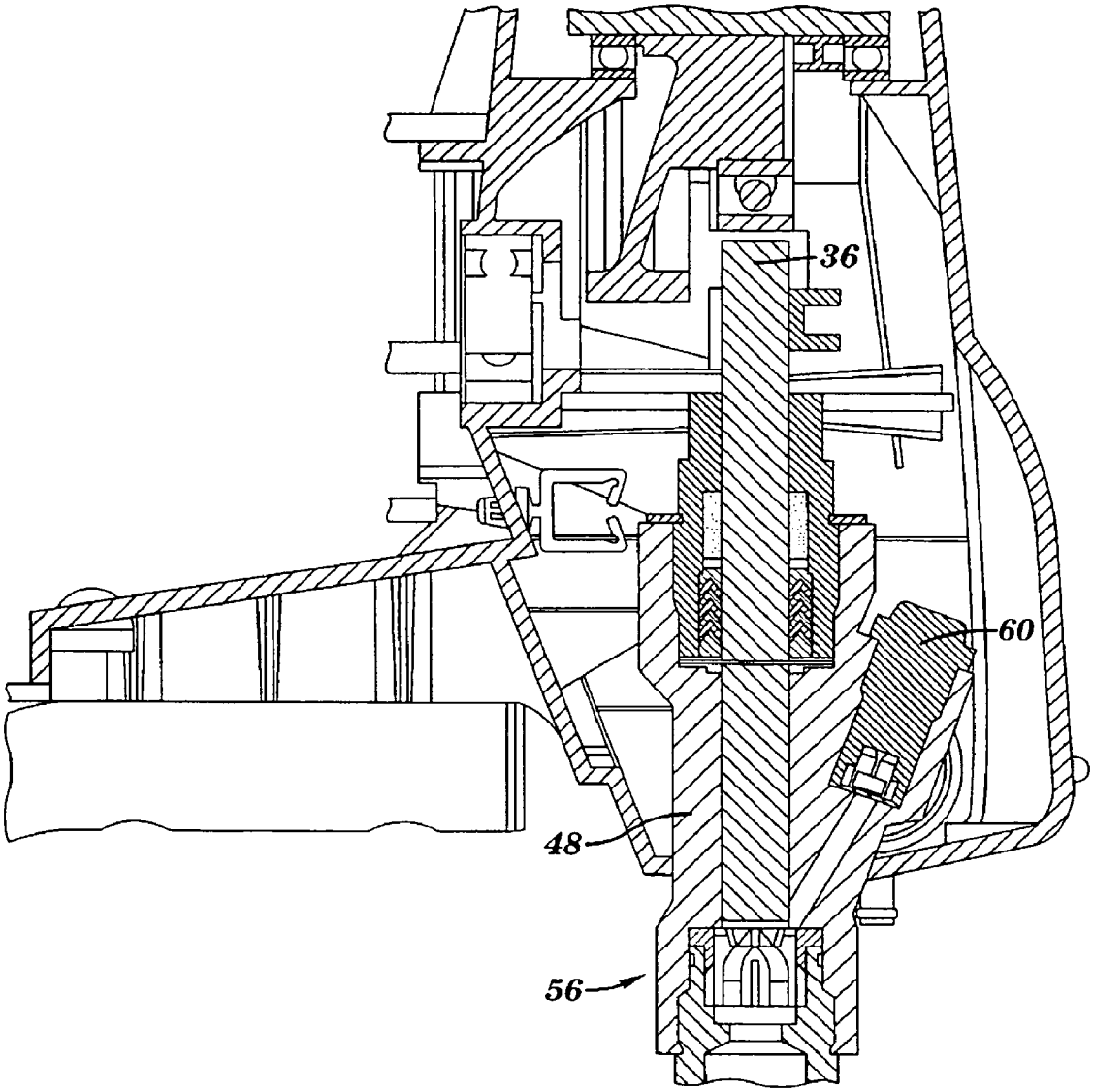
FIG. 5 is a cross-sectional view of the pump of the instant invention.

The instant invention generally designated 10 is comprised of a main drive housing 12 having a motor 14 mounted to the rear thereof. A gear assembly 16 having a rear bearing 17 and gear teeth 22 is inserted into the bearing housing 20 of drive housing 12 *to define gear centerline 41*. Gear teeth 22 on gear assembly 16 mate with the teeth on pinion 24 on the end of motor 14. The teeth 22 and on pinion 24 are formed with a 5° helical angle and have a 25° pressure angle. This geometry combines the higher efficiency of straight cut gears with the noise reduction typified in a helical design.

An eccentric 25 is also molded onto the front of gear assembly 16 and has located thereabout a bearing assembly 28 which rides inside a yoke 30. Yoke 30 moves vertically on guide rods 32 which are retained in pockets 34 of drive housing 12. Yoke 30 is molded of plastic. Gear assembly 16 is cast in ZA-12 with an integral counterweight leading to lower cost and easier manufacture.

Pump rod 36 is provided with a cap 38 over the top end thereof which has bearing upon it bearing 28. Pump assembly 40 is designed as a single acting pump that is the pump only pumps on the downward stroke and loads on the upward stroke. In doing so this allows the components of the drive train, including the yoke and gear, to be much lighter as the yoke 30 ends up being more of a guidance device rather than a force-applying device.

As can be seen more particularly in FIG. 2, motor and pinion 24 are offset from the centerline 42 of pump assembly 40 which also has offset therefrom bearing [20] *28* in the opposite direction. Also, this arrangement does not have any significant cantilevering as the pump rod, pinion, yoke, eccentric and cap are all located in the same plane. The location of the rod and the single acting pump with respect to the gear centerline *41* reduces the thrust loads on the yoke. The location of the pinion on the gear partially offsets and reduces the pump forces on the gear shaft and bearings. By locating the eccentric bearing directly on the end of the pump rod cap which is press-fit it eliminates the transfer of pumping force through an intermediate member such as the yoke which provides longer life, efficiency and allows the manufacture of a more inexpensive yoke assembly.

The shaft packing assembly 44 shown in FIG. 4 is comprised of a packing housing 46 which screws into pump housing 48 and which contains a felt member 50 which has been soaked with throat seal lubricant or other solvent or lubricant. A stack of v-packings 52 are compressed in place by wave spring 54 which is tightened by tightening seal housing 46 into pump housing 48.

Turning to FIG. 7, inlet check 56 is provided with a check ball 58, a check seat 60 which is pressed into check housing 62 and which is held in place by retainer and integral ball guide 64. These parts all press-fit into one another such that the complete assembly be merely screwed into main pump housing 48 for replacement. Similarly, outlet check assembly *57* is formed of an outlet check housing 60 which is screwed into pump housing 48 and similarly is provided with a check ball 62 held in place by ball seat 65. As can also be seen in FIG. 7, the outlet passageway 66 is angled relative to the axis of pump shaft 36. This allows the outlet check assembly [58] *57* to operate essentially via gravity and yet requires only the drilling and provision of one passageway while maintaining an essentially vertical ball-seat relationship.

Figure 9:
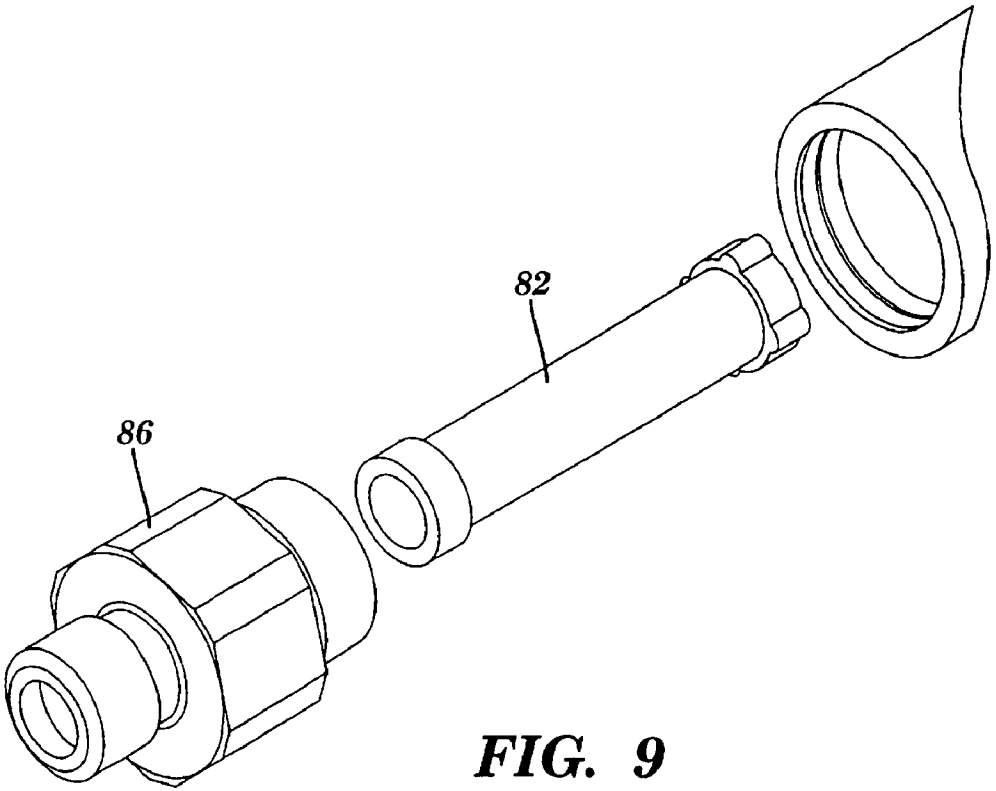
FIG. 9 is an exploded view of the outlet filter of the instant invention.
Figure 8:
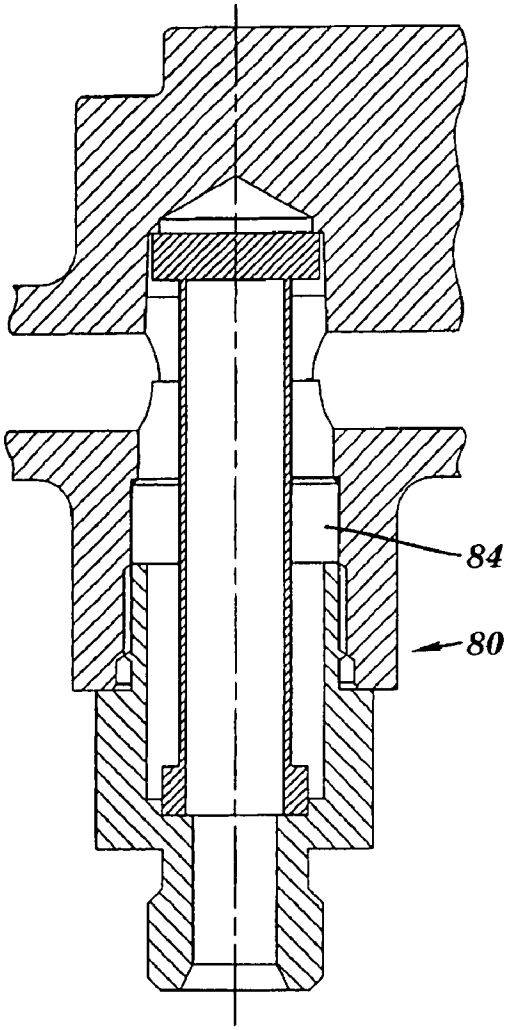
FIG. 8 is a cross-section of the outlet filter of the instant invention.

FIGS. 8 and 9 show the outlet filter assembly 80 which is comprised of a filter element 82 contained in passage 84 of pump assembly 40 and which is retained by fitting 86.

Turning to FIG. 10, inlet tube 70 is provided with a female threaded end 70a. Inlet filter screen assembly 72 has a male threaded end 72a for threaded engagement with end 70a. Ends 70a and 72a use the same size and thread as a common garden hose such that a user need merely remove screen assembly 72, attach a garden hose to inlet tube 70, turn on the water and flush out the assembly.

It is contemplated that various changes and modifications may be made to the airless spray pump without departing from the spirit and scope of the invention as defined by the following claims.

What is claimed is:

1. A spray pump powered by a rotary motor having a pinion thereon and comprising:

a housing;

a single-acting piston pump having a pump rod and connected to said housing;

a drive gear assembly comprising a gear *rotatable about a gear centerline,* and an eccentric located on said gear;

a bearing located about said eccentric; and a yoke reciprocatingly located in said housing and about said bearing;

wherein said *gear centerline,* motor and pinion are offset from [the] *a* centerline of said pump to reduce [the] thrust loads on the yoke and offset and reduce [the] pump forces.

2. The spray pump of claim 1 wherein [the] teeth on said gear are formed with about a 5° helical angle and about a 25° pressure angle.

3. The spray pump of claim 1 wherein said [motor and] pinion [are offset from the centerline of said pump to reduce the thrust loads on the yoke and offset and reduce the pump forces] *is driven by said motor and engages teeth of said gear to rotate said gear and said eccentric about the gear centerline*.

4. An airless spray pump having an inlet tube and an inlet filter screen, the improvement comprising said inlet tube being provided with a female threaded end and said inlet filter screen assembly being provided with a male threaded end threaded engagement with female end, said ends having the same size and thread as a common garden hose such that a user need merely remove said screen assembly and attach a garden hose to said inlet tube to flush out the assembly.

*5. The spray pump of claim 1, wherein the single-acting piston pump pumps on a downward stroke of the pump rod and loads on an upward stroke of the pump rod.*

*6. The spray pump of claim 5, wherein the pump rod is aligned with the centerline of the pump.*

*7. The spray pump of claim 6, wherein the pump rod, yoke, and bearing are located in a common plane.*

*8. The spray pump of claim 1, wherein the eccentric is integral with a front of the gear assembly.*

*9. The spray pump of claim 1 and further comprising a motor mounted to a rear portion of the housing.*

*10. The spray pump of claim 9, wherein the pinion is driven by the motor.*

*11. A spray pump comprising:*

*a rotary motor;*

*a pinion driven by the rotary motor;*

*a housing;*

*a single-acting piston pump having a pump rod and connected to said housing wherein the single-acting piston pump pumps on a downward stroke of the pump rod and loads on an upward stroke of the pump rod, and wherein the pump rod is aligned with a centerline of the piston pump;*

*a drive gear assembly comprising a gear driven by the pinion about a gear centerline, and an eccentric located on said gear;*

*a bearing located about said eccentric; and*

*a yoke reciprocatingly located in said housing and about said bearing so that rotation of the gear and the eccentric produce reciprocal motion of the yoke;*

*wherein said gear centerline, motor and pinion are offset from the centerline of said pump to reduce the thrust loads on the yoke and offset and reduce the pump forces.*

*12. The spray pump of claim 11, wherein the pump rod, yoke, and bearing are located in a common plane.*

*13. The spray pump of claim 11, wherein the pump rod, yoke, eccentric, and bearing are located in a common plane.*

*14. The spray pump of claim 11, wherein the eccentric is integral with a front of the gear assembly.*

*15. The spray pump of claim 11 wherein the motor is mounted to a rear portion of the housing.*

*16. The spray pump of claim 11, wherein the pinion includes teeth that engate teeth on an outer circumferential surface of the gear.*

*17. The spray pump of claim 11, wherein said teeth on said gear and said pinion are formed with about a 5° helical angle and about a 25° pressure angle.*

* * * * *